United States Patent
Tryon et al.

(10) Patent No.: US 7,226,384 B2
(45) Date of Patent: *Jun. 5, 2007

(54) TORSIONAL DAMPER FOR ELECTRICALLY-VARIABLE TRANSMISSION WITH LOCK-OUT CLUTCH ASSEMBLY

(75) Inventors: Eric S. Tryon, Indianapolis, IN (US); Joel E. Mowatt, Zionsville, IN (US); James A. Raszkowski, Indianapolis, IN (US); Richard L. Wagner, Quincy, IN (US)

(73) Assignees: GM Global Technology Operations, Inc., Detroit, MI (US); DaimlerChrysler AG, Stuttgart (DE); DaimlerChrysler Corporation, Auburn Hills, MI (US)

( * ) Notice: Subject to any disclaimer, the term of this patent is extended or adjusted under 35 U.S.C. 154(b) by 168 days.

This patent is subject to a terminal disclaimer.

(21) Appl. No.: 11/061,106

(22) Filed: Feb. 18, 2005

(65) Prior Publication Data

US 2005/0205379 A1    Sep. 22, 2005

Related U.S. Application Data

(60) Provisional application No. 60/555,141, filed on Mar. 22, 2004.

(51) Int. Cl.
*B60W 30/20*    (2006.01)
*F16D 3/14*     (2006.01)

(52) U.S. Cl. .......................... 477/5; 475/5; 192/55.61; 192/70.17; 192/201; 192/212

(58) Field of Classification Search ................. 192/201
See application file for complete search history.

(56) References Cited

U.S. PATENT DOCUMENTS

| | | | | |
|---|---|---|---|---|
| 3,296,887 | A * | 1/1967 | Larsen | 464/68.41 |
| 3,380,566 | A * | 4/1968 | Cook | 192/213 |
| 4,624,351 | A * | 11/1986 | Lutz et al. | 192/48.5 |
| 5,009,301 | A | 4/1991 | Spitler | 192/106.2 |
| 5,558,589 | A * | 9/1996 | Schmidt | 475/5 |
| 6,332,521 | B1 * | 12/2001 | Shoji | 192/55.61 |
| 2005/0205381 | A1 * | 9/2005 | Tryon et al. | 192/214 |
| 2005/0205382 | A1 * | 9/2005 | Tryon et al. | 192/214 |

FOREIGN PATENT DOCUMENTS

EP    1396368 A2 *    3/2004

* cited by examiner

*Primary Examiner*—Richard M. Lorence
(74) *Attorney, Agent, or Firm*—Christopher DeVries

(57) ABSTRACT

The present invention relates to a torsional damper for an electrically-variable transmission. The torsional damper is equipped with a lock-out clutch to directly couple the engine to the input shaft of the transmission. The electric motors provided with the electrically-variable transmission can serve to effectively cancel out engine compression pulses when the springs of the torsional damper are locked out. The present invention also includes damper springs of variable rates to effectively attenuate distinctive or inconsistent torque fluctuations when the engine is operating in displacement-on-demand mode.

9 Claims, 1 Drawing Sheet

TORSIONAL DAMPER FOR ELECTRICALLY-VARIABLE TRANSMISSION WITH LOCK-OUT CLUTCH ASSEMBLY

CROSS-REFERENCE TO RELATED APPLICATIONS

This application claims the benefit of U.S. Provisional Application 60/555,141 filed Mar. 22, 2004, which is hereby incorporated by reference in its entirety.

TECHNICAL FIELD

The present invention relates to an electrically-variable transmission with a torsion damper assembly having a lock-out clutch to selectively lock the damper springs of the torsional damper assembly to allow an electric motor to cancel the compression pulses produced by an internal combustion engine when the I.C. engine is operating within a start and/or stop speed range.

BACKGROUND OF THE INVENTION

Automobile engines produce torsionals or vibrations that are undesirable to transmit through the vehicle transmission. To isolate such torsionals, torsional dampers can be implemented into the vehicle transmission. These dampers rest between the engine crankshaft and the input shaft or turbine shaft of the transmission to substantially counteract the unwanted torsionals generated by the engine. Dampers are configured with springs that have the capacity to carry maximum engine torque plus some margin above.

One premise behind hybrid automobiles is that alternative power is available to propel the vehicle, thus reliance on the engine for power can be decreased, thereby increasing fuel economy. Since hybrid vehicles can derive their power from sources other than the engine, hybrid engines typically operate at lower speeds more often and can be turned off while the vehicle is propelled by the electric motors. For example, electrically-variable transmissions alternatively rely on electric motors housed in the transmission to power the vehicle's driveline. Engines in hybrid vehicles are therefore required to start and stop more often than engines in non-hybrid systems. Compression pulses are generated by the engine during starts and stops that can produce undesirable vibration in hybrid vehicles such as those having an electrically-variable transmission. Therefore, greater functionality is desirable in the damper assembly to aid the electrically-variable transmission in canceling these compression pulses.

Also, engines equipped with displacement-on-demand functionality can selectively deactivate certain engine cylinders to save on fuel. This mode of operation produces distinctive (or inconsistent) torque fluctuations from the engine operating on all cylinders.

SUMMARY OF THE INVENTION

In order to reduce driveline vibrations in a hybrid vehicle, the present invention provides a torsional damper assembly having a lock-out clutch which prevents (or locks) the damper springs from compressing and relaxing. Compatible with an electrically-variable transmission (or EVT), the present invention allows an electric motor in the EVT to effectively cancel out the engine compression pulses resulting from the engine pistons during starts and stops when the lock-out clutch is engaged.

The present invention is further compatible with a displacement-on-demand engine, which produces distinctive (or inconsistent) torque fluctuations. To compensate, the present invention includes a plurality of damper springs of sufficiently different rates to accommodate the various torque fluctuations.

More specifically, the present invention provides a vehicle having an internal combustion engine characterized as generating compression pulses during start and/or stop modes of operation and torsionals during other modes of operation; and an electrically-variable transmission having a torsional damper assembly for absorbing such torsionals. The torsional damper assembly includes a damper flange rotatable with the engine, having a damper spring enabling the torsional damper assembly to absorb such engine torsionals during the other modes of operation. Further provided is a lock-out clutch selectively engageable with the damper flange. The selective engagement of the lock-out clutch locks out the damper springs, and at least one electric motor in the electrically-variable transmission is operable to selectively cancel the engine compression pulses when the damper spring is locked out.

The present invention also provides a method of selectively canceling the compression pulses and torsionals of an engine with an electrically-variable transmission when the engine is operating within a plurality of operating modes having different predetermined speed ranges. The method includes: providing a torsional damper and lock-out clutch between the engine and the electrically-variable transmission; energizing the lock-out clutch to lock out the torsional damper; and operating an electric motor in the electrically-variable transmission in a manner to cancel engine compression pulses when the torsional damper is locked out.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
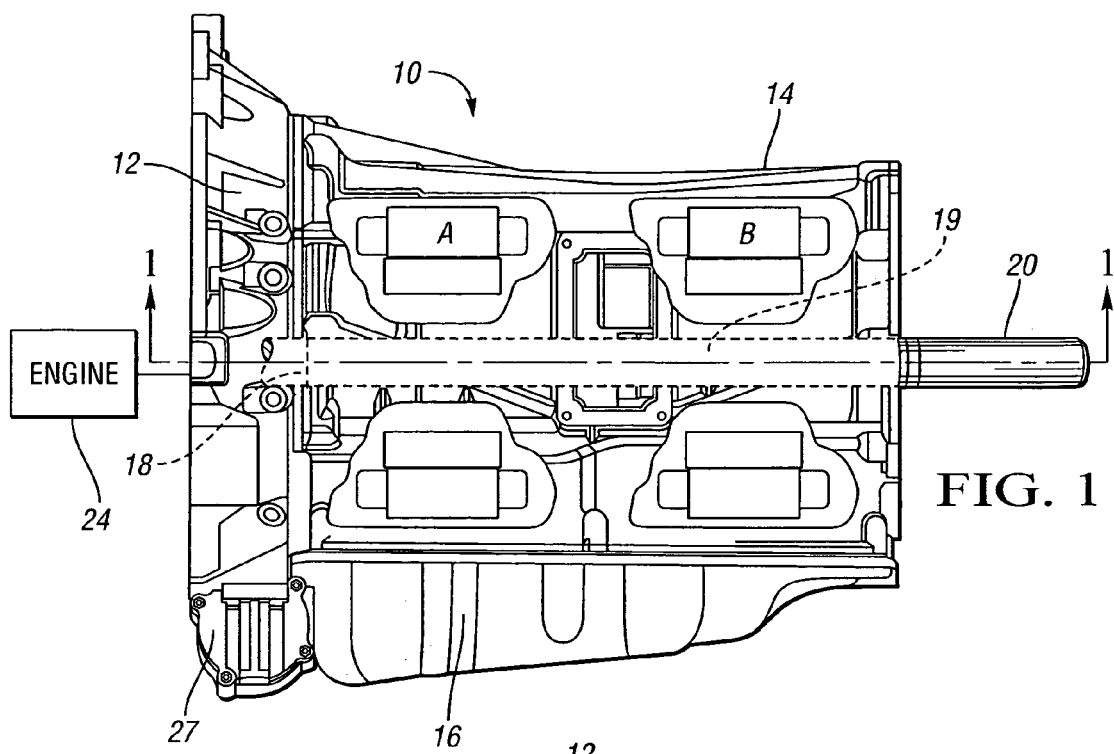
FIG. 1 is a schematic side view of an electrically-variable transmission with parts broken away to show selected transmission components and an auxiliary pump mounted to the transmission.
Figure 2:
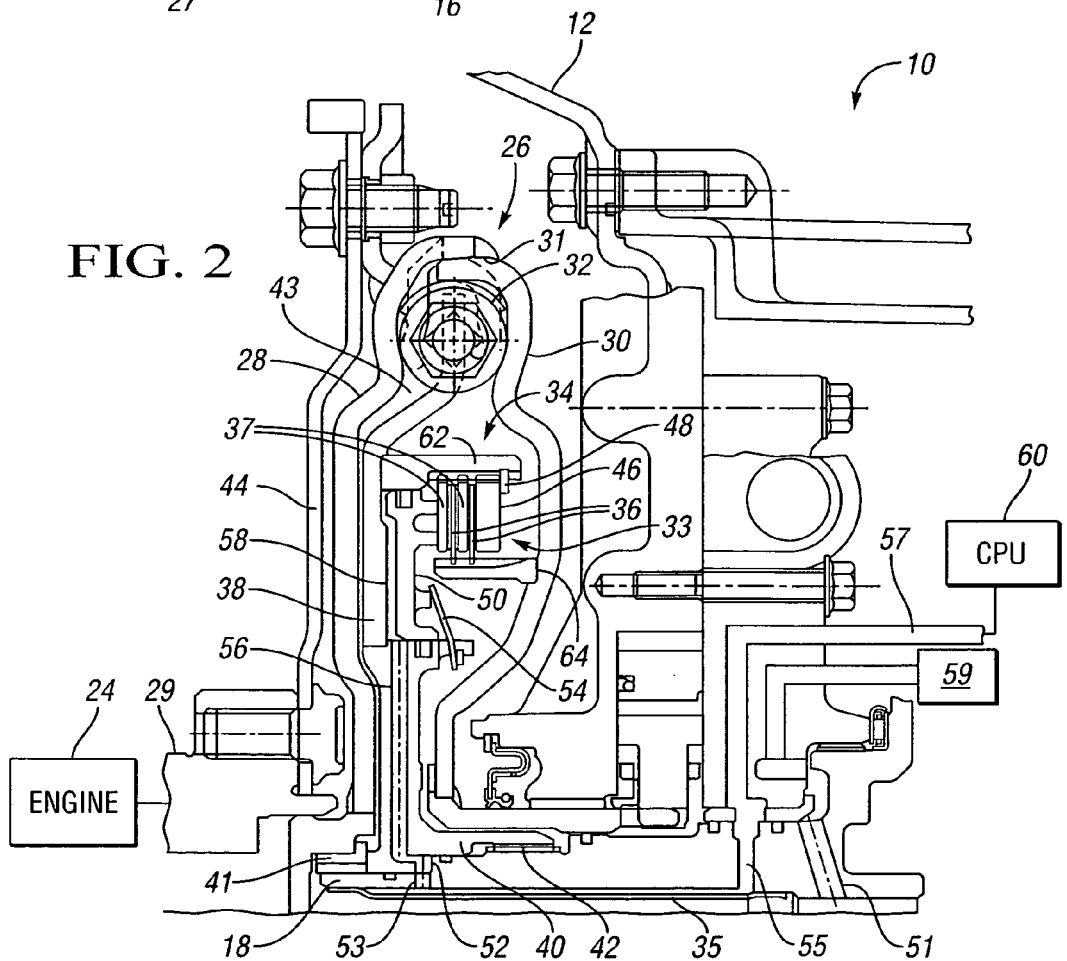
FIG. 2 is a fragmentary cross-sectional view of the invention taken along one side of the centerline of the front portion of the electrically-variable transmission.

Referring to the drawings, FIGS. 1 through 2, wherein like characters represent the same or corresponding parts throughout the several views, there is shown in FIG. 1 a side view of an electrically-variable transmission 10. Fundamentally, as the internal combustion engine 24 operates at different rotational speeds it produces torsionals (i.e., vibrations). When the engine 24 is being fueled or energized and it is under power, the engine produces torsionals that are undesirable to transmit to the transmission 10. When the engine 24 is not being fueled or is not under power (as in start and/or stop mode), the pistons (not shown) of the engine still generate compression pulses. Each can produce vibrations that can be felt by the vehicle operator. To cancel out the torsionals and compression pulses during drive mode, an electrically-variable transmission 10, as shown in FIG. 1, is equipped with a selectively influential torsional damper assembly 26, as shown in FIG. 2. The torsional damper assembly 26 includes a damper flange 38 rotatable with the engine 24, having a damper spring 32 enabling the torsional damper assembly to absorb such engine torsionals during the other modes of operation. By way of example, the torsional damper assembly 26 may be configured, in part, as shown in U.S. Pat. No. 5,009,301, commonly assigned with the present invention, and hereby incorporated by reference in its entirety. When the torsional damper assembly 26 is not influencing the electrically-variable transmission 10, i.e., when the damper springs 32 are locked out by the lock-out clutch 33, at least one of the electric motors (A or B as shown in FIG. 1) of the electrically-variable transmission effectively cancels out the compression pulses produced by the internal combustion engine 24.

More specifically, FIG. 1 displays selected components of an electrically-variable transmission 10 including the input housing 12 and main housing 14 with dual electric motors (A and B), which are indirectly journaled onto the main shaft 19 of the transmission 10 through a series of planetary gear set (not shown). The motors (A, B) operate with selectively engaged clutches (not shown) to rotate the output shaft 20. The oil pan 16 is located on the base of the main housing 14 and is configured to provide oil volume for the transmission 10 and its components. The main housing 14 covers the inner most components of the transmission such as the electric motors (A, B), planetary gear arrangements, the main shaft 19 and two clutches (all of which are mentioned for exemplary purposes and not all are shown). Finally, the input housing 12 is bolted directly to the engine block rear face of the engine 24 (schematically represented in FIG. 2) and encases the transmission components that mechanically interface with the engine 24. Namely, the input housing 12 covers the torsional damper assembly 26 (shown better in FIG. 2). The input housing 12 also supports an auxiliary pump 27 (as shown in FIG. 1), which is mounted to the base of the input housing 12 and secured nestably adjacent the oil pan 16.

The torsional damper assembly 26, as shown in FIG. 2, generally functions to isolate the transmission 10 from unwanted torsionals generated by the engine 24 during operation and also to selectively aide the transmission electric motors (either A or B) in canceling engine compression pulses during starts and stops. The torsional damper assembly 26 consists of an engine side cover 28, which is affixed to the engine crankshaft 29. The engine side cover 28 is welded to the transmission side cover 30 at 31 and houses the damper springs 32. The two covers (28 and 30) define a vessel 34, which encloses the lock-out clutch 33 and a piston 50. The torsional damper assembly 26 further houses a damper flange 38 with hub portion 40 that mates to the input shaft 18 at complementary splines 42. The engine side cover 28 of the torsional damper assembly 26 is affixed to an engine flexplate 44. The flexplate 44 functions to transmit to the transmission the torque produced by the engine 24 and also to absorb any thrust loads generated by the damper assembly 26. The torsional damper assembly 26 consists of a series of damper springs 32 running annularly or circumferentially between the engine side cover 28 and transmission side cover 30. The damper springs 32 absorb and dampen the unwanted torsionals produced by the engine 24 during normal or drive mode operation. The torsional damper assembly 26 has a torque capacity equal to the maximum torque capacity of the engine plus some margin.

The electrically-variable transmission 10 is equipped with two electric motors (A and B as shown in FIG. 1). Electric motor A creates a torque during start and stop that effectively cancels out the engine compression pulses caused when the engine is operating at speeds below 600 rpm (or in start and/or stop mode). One technical advantage of the present invention is that the damper springs 32 of the torsional damper assembly 26 can be locked out by applying the clutch plates 36 and 37 (of the lock-out clutch 33) when the engine 24 is operating within the predetermined speed range. In the preferred embodiment, the torsional damper assembly 26 is effectively locked out when the engine is operating at speeds less than or equal to 600 rpm. This mode of operation is desirable because in an electrically-variable transmission either electric motor (A or B) can be used to actively cancel out engine compression pulse generated during start or stop.

The lock-out clutch 33, located inside the torsional damper assembly 26, consists of two reaction plates 37 connected to the damper flange 38, two friction plates 36 connected to the transmission side cover 30, a backing plate 46 and a snap ring 48 that is attached to the damper flange 38 at arm 62. The lock-out clutch 33 is adjacent a hydraulic piston 50 which moves against the reaction plates 37 forcing them to engage the friction plates 36. The piston 50 moves in response to oil fed into cavity 58 from an oil source 57. The load is reacted at the backing plate 46 and snap ring 48 and contained by the damper flange 38. Adjacent the piston 50 and affixed to the damper flange 38 is the damper hub 40 of the torsional damper assembly 26, which has a cross-drilled channel 56 and a radially extending aperture 52 that allow oil from source 57 to pass through. The oil extends through a cross-drilled aperture 55 in the input shaft 18 through aperture 53 in the input shaft 18, into the channel 56 to the front side of the piston 50. The piston 50 is restricted from engaging with the lock-out clutch 33 and held in the disengaged position by a return spring 54. As oil is fed through channel 56 of the damper hub 40, the pressure inside the piston cavity 58 increases, creating a load sufficient to overcome the spring force and stroke the piston 50, thereby engaging the lock-out clutch 33. The vessel 34 is also filled with oil from the source 59 and the oil circuit defined by tube 35 fitted in the inner diameter of the input shaft 18, the perforated thrust washer 41 and the cavity or spacing 43 to the interior of vessel 34. The oil thus received in vessel 34 is on one side of the piston 50 to counter balance the oil fed into cavity 58 on the other side of the piston 50.

The hydraulic circuit 57 which is controlled by the transmission control unit 60 (or other control processing unit) and source 59 govern the lock-out clutch 33, commanding it to engage and disengage under certain predetermined conditions. The transmission control unit 60 does so by directing pressurized oil to the front of the piston 50. The piston 50 inside the torsional damper assembly 26 responds to the increased pressure by stroking and engaging the lock-out clutch 33 to effectively lock out the damper springs 32. When the lock-out clutch 33 is engaged the torsional damper springs 32 are deactivated or locked out so that the engine 24 is directly coupled to the input shaft 18 of the transmission 10. This condition is only preferred for engine starts and stops (i.e., the start and/or stop modes wherein engine speeds are within the predetermined speed range: between 0 and 600 rpms).

Engagement of the lock-out clutch 33 typically causes axial loading that is transferable to mechanically linked transmission components. However, the present invention is designed such that the hydraulic loads produced are effectively grounded within the torsional damper flange 38. The snap-ring 48 grounds the load to the symmetrical arm 62 of the damper flange 38 canceling the hydraulic load. Therefore, another technical advantage of the present invention is that the damper flange 38 and lock-out clutch 33 are configured to significantly ground mechanical loads resulting from the engagement of the lock-out clutch 33 so as to prevent the mechanical loads from being transferred to the engine side cover 28 or transmission side cover 30.

The present invention is also compatible with displacement-on-demand (DOD) engines. Engines equipped with displacement-on-demand systems can deactivate a selected number of cylinders in the interest of fuel economy. Altering the number of operating cylinders also alters the torque signature (or torque fluctuations) produced by the engine. In order for the transmission 10 to effectively reduce or cancel out vibration caused when in displacement-on-demand mode, the torsional damper assembly 26 is equipped with a plurality of damper springs 32 which have variable rates. In the preferred embodiment, the torsional damper assembly 26 is a two-stage configuration. The first stage (of springs) has a low rate with a relatively large amount of spring travel. The low rate attenuates the torque fluctuations generated by the engine when operating in displacement-on-demand mode. The low rate also lowers the amount of counter torque necessary from the electric motor A in transmission 10 required to counter the torque fluctuations. The second stage has a higher rate with a relatively low amount of spring travel. The higher rate is necessary to achieve a damper spring 32 capacity sufficient to isolate the transmission 10 from the torsionals produced by the engine 24 at maximum engine torque or when the engine is utilizing all cylinders. The combined rates enable maximum performance in both modes of operation.

The present invention further includes a method of selectively canceling the compression pulses and torsionals of an engine with an electrically-variable transmission when the engine is operating within a plurality of operating modes having different predetermined speed ranges. The method includes: providing a torsional damper 26, as shown in FIG. 2, and lock-out clutch 33 between the engine 24 and the electrically-variable transmission 10; energizing the lock-out clutch 33 to lock out the torsional damper 26; and operating an electric motor (A or B of FIG. 1) in the electrically-variable transmission 10 in a manner to cancel engine compression pulses when the torsional damper is locked out. The lock-out clutch 33 is energized when the engine 24 is operating between 0 rpm and 600 rpm. In another aspect of the present invention, the engine 24 is a displacement-on-demand engine configured with selective cylinder deactivation. The torsional damper assembly 26 is therefore equipped with a plurality of damper springs 32 having different spring rates to isolate torsionals produced by the engine utilizing all cylinders under maximum torque but to also effectively attenuate torque fluctuations resulting from the engine operating in displacement-on-demand mode.

While the best modes for carrying out the invention have been described in detail, those familiar with the art to which this invention relates will recognize various alternative designs and embodiments for practicing the invention within the scope of the appended claims.

The invention claimed is:

1. A vehicle having an internal combustion engine characterized as generating compression pulses during start and/or stop modes of operation and torsionals during other modes of operation; and an electrically variable transmission having a torsional damper assembly for absorbing such torsionals, the torsional damper assembly comprising:

a damper flange rotatable with said engine, having a damper spring enabling the torsional damper assembly to absorb such engine torsionals during the other modes of operation;

a lock-out clutch selectively engageable with said damper flange for locking out the damper spring; and at least one electric motor in the electrically variable transmission operable to selectively cancel the engine compression pulses when the damper spring is locked out.

2. The vehicle of claim 1, wherein the engine is a displacement-on-demand engine configurable with selective cylinder deactivation; wherein said cylinder deactivation may cause the engine to produce inconsistent torque fluctuations; and wherein said damper flange has a plurality of damper springs and at least one of said damper springs is of a sufficiently lower spring rate than at least another of said damper springs so as to enable the torsional damper assembly to attenuate such inconsistent engine torque fluctuations when the engine is operating in the other modes of operation.

3. The vehicle of claim 1, wherein said damper flange and torsional damper assembly are configured to significantly ground mechanical loads resulting from said engagement of said lock-out clutch so as to prevent such mechanical loads from being transferred.

4. An electrically variable transmission having a torsional damper assembly for absorbing torsionals, the torsional damper assembly, comprising:

a rotatable damper flange, having a damper spring enabling the torsional damper assembly to absorb such torsionals;

a lock-out clutch selectively engageable with said damper flange for locking out said damper spring;

at least one electric motor in the electrically variable transmission operable to selectively cancel out compression pulses when the damper spring is locked out.

5. The transmission of claim 4, wherein said damper flange has a plurality of damper springs and at least one of said damper springs is of a sufficiently lower spring rate than at least another of said damper springs so as to enable the torsional damper assembly to attenuate inconsistent torque fluctuations.

6. The vehicle of claim 4, wherein said damper flange and torsional damper assembly are configured to significantly ground mechanical loads resulting from said engagement of said lock-out clutch so as to prevent such mechanical loads from being transferred.

7. A method of selectively canceling the compression pulses and torsionals of an engine with an electrically variable transmission when the engine is operating within a plurality of operating modes having different predetermined speed ranges, comprising:

providing a torsional damper and lock-out clutch between the engine and the electrically variable transmission;

energizing the lock-out clutch to lock out the torsional damper, and operating an electric motor in the electrically variable transmission in a manner to cancel engine compression pulses when the torsional damper is locked out.

8. The method of claim 7, wherein the engine is a displacement-on-demand engine configurable with selective cylinder deactivation; wherein said cylinder deactivation may cause the engine to produce inconsistent torque fluctuations; and wherein said damper assembly has a plurality of damper springs and at least one of said damper springs is o a sufficiently lower rate than at least another of said damper springs so as to enable the torsional damper assembly to attenuate said torque fluctuation.

9. The method of claim 7, further comprising:
energizing said lock-out clutch when the engine is operating between 0 rpm and 600 rpm; and
deactivating said lock-out clutch when the engine is operating above 600 rpms, thereby enabling said damper springs to absorb the engine torsionals.

* * * * *